March 14, 1950  O. W. PHILLIPS  2,500,565
EDUCATIONAL DEVICE
Filed July 21, 1945
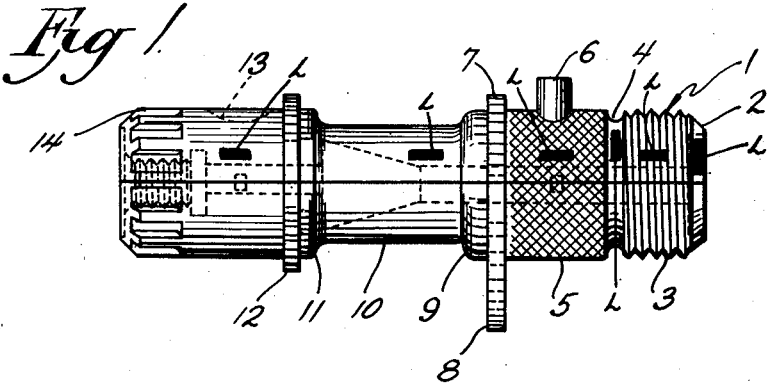
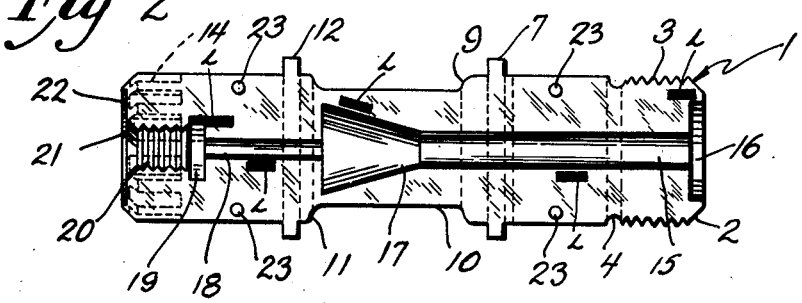
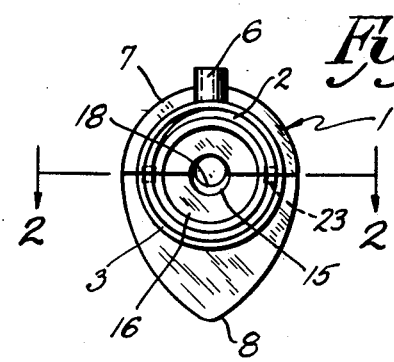
INVENTOR.
Ollie W. Phillips
BY Albert H. Kirchner,
Attorney.

Patented Mar. 14, 1950

2,500,565

UNITED STATES PATENT OFFICE 2,500,565

EDUCATIONAL DEVICE

Ollie W. Phillips, Chicago, Ill.

Application July 21, 1945, Serial No. 606,423

5 Claims. (Cl. 35—1)

The present invention relates to educational devices and more particularly to a device for teaching the nomenclature, appearance and function of machine parts.

A principal object of the invention is to provide a device which will be useful to the student of machine elements and parts, such as the machinist, engineer, draftsman, designer or the like, in learning the names by which such parts and elements are known and in recognizing them by their appearance and in understanding their functions.

A further object is to provide such a device in concrete, three-dimension form which can be handled, felt and viewed from all sides, so that the impressions made by it on the mind and memory of the student will be considerably more vivid and permanent than any effects obtainable by the use of mere pictorial illustrations or written descriptions.

A related object is to provide such a device in a form that will be small and compact, so that it can easily be carried in the pocket, and which will nevertheless be comprehensive in its capacity to instruct the student in a great variety of different machine parts.

Another object is to make such a device as will show internal shapes and forms, such as those appurtenant to the bore of a mechanical part, and to show them clearly from the outside of the device.

A further object is to provide a device of the character indicated in which parts can be separated from each other to disclose, in the manner of a sectional view in a mechanical drawing, but with all the added force and impressiveness of a solid, three-dimensional body, the shape and appearance of mechanical parts which are internal and which are consequently in actual practice hidden from view.

A further object is to provide such a device with indicia denominating the several parts so that their names may be readily learned and fixed in the student's mind by seeing them physically associated with the parts or keyed to them by a system of code designations.

General objects are concerned with making an article of manufacture of the class indicated which will be very inexpensive to produce and which will be attractive in appearance and thoroughly durable.

With these and other objects in view, a preferred embodiment of the invention, which has been found entirely satisfactory in actual practice and which is therefore at present preferred by me, is shown in the accompanying drawing, in which Fig. 1 is a side elevational view of the device;

Fig. 2 is a plan view of one of the two generally similar, separable parts in which the device may be constructed, so that in effect Fig. 2 is a central longitudinal sectional view, taken along the line 2—2 of Fig. 3, of the assembled parts shown in Figs. 1 and 3; and Fig. 3 is an end elevational view of the assembled parts.

Referring now to the drawing, the device comprises a solid, rigid body which in the present instance is generally cylindrical in shape, made out of any suitable material which can be cast, molded or machined conveniently. The body is capable of more efficiently and completely attaining the objects of the invention if it is made hollow by being provided with an internal bore because in such case the bore can be shaped and configured in the form of internal machine parts. The outer surface of the body, as will be understood from what has been explained hereinabove, is shaped and configured to simulate external machine parts.

The body may be made of a single, unitary piece of material, but I prefer to form it in two generally similar halves having matching faces which are adapted to be engaged together so that the two halves can be secured to each other to provide an apparently solid body which can be opened up, by separating the halves, to disclose the internal construction. This preferred embodiment is disclosed in the drawing.

While the body may be made from any of a large number of suitable materials, I prefer to use one which is transparent, so that the internal features of the construction may be viewed through the body, from the outside. The present market affords a number of thermoplastic and other materials, many of them being artificial resins and condensation products, which are suitable for the purpose. A preferred substance, which I have used in actual practice with complete success, is the material known as "Lucite," which is a brand of methyl methacrylate made by E. I. du Pont de Nemours & Co., Inc., Plastics Department, Arlington, New Jersey. This material is easily molded and machined, and it provides a sufficiently hard and durable body which is highly transparent.

Whether made in one piece or in two, the external surface of the body, designated generally 1 in Fig. 1, is shaped and configured in the form of a plurality of machine parts and elements. Thus, in the illustrated embodiment of the invention, the exterior of the body 1 is formed in the shape of a chamfer at 2, an external thread at 3, an external undercut at 4, a knurl at 5, a boss at 6, a cam at 7 with its lobe at 8, a radius at 9, a journal at 10, a fillet at 11, a flange at 12, a Woodruff keyway at 13 and a series of splines at 14.

Internally, the body is bored, preferably throughout its whole length and more or less axially, and the bore is shaped and configured variously along the different portions of its length in the shape of machine parts and elements which are normally found on the inside of a mechanical element. Thus, in the illustrated embodiment of the invention, the bore 15 is counterbored at 16 and provided with a taper at 17. Into one end of this taper an eccentric hole or bore 18 leads, and it is provided with an internal undercut 19. The bore ends at the left hand side of the body as viewed in Figs. 1 and 2 in an internal thread 20, a countersink 21 and a spotface or seat 22.

Each of the parts named, and any others which may be provided in addition to or substitution for them, may have associated with it some indicia denominating it, as shown at L, which may take the form of the name of the part fully spelled out or of some key which can be interpreted from a code. Thus the student will have before him a physical, three-dimensional model of each part, associated with its name or a key to its name.

The two halves of the preferred embodiment shown in the drawing are adapted to be secured separably together by dowels 23 outstanding from one of the parts and received in sockets formed in the companion part. The two halves may thus be readily separated so that the interior of the body can be seen in much the same way as a sectional view in a mechanical drawing, but with all the added force and impressiveness of a solid object which can be felt and handled.

When the halves are assembled, the transparency of the material permits the internal structure to be clearly viewed from the outside of the body, and of course the joined halves present the appearance of a body in one piece, so that the student can understand and appreciate the relation between the external surfaces of the body and its internal shapes and parts.

It is believed that the structure, uses and principal advantages of the educational device provided by the present invention will, from the foregoing description of a certain preferred embodiment, be sufficiently clear to those skilled in the art. It is to be understood that the details and specific arrangements and relations of the parts are subject to variation and differences of design and selection, and that not all of the several features need be used in the particular combinations and relations shown.

I claim:

1. As an article of manufacture, an educational device comprising a pair of members of transparent material having substantially similar, generally plane surfaces, dowel means holding the members separably together with said surfaces in mutual engagement, said surfaces and the outer surfaces of the members being configured in the shapes of machine parts for the purpose of illustrating the shapes of such parts for the benefit of a student, and indicia borne by the surfaces denominating the several machine parts, the indicia borne by the first named surfaces and the machine parts in which said surfaces are configured being visible from said outer surfaces, through the transparent material of the members.

2. As an article of manufacture, an educational device comprising a pair of members of transparent material having substantially similar, generally plane mating surfaces, and means holding the members separably together with said surfaces in mutual engagement, said surfaces and the outer surfaces of the members being configured in the shapes of machine parts for the purpose of illustrating the shapes of such parts for the benefit of a student, and the machine parts in which said mating surfaces are configured being visible from said outer surfaces, through the transparent material of the members.

3. The device claimed in claim 2, in which each member is substantially semi-cylindrical and the mating surface thereof is configured to provide the device composed of the engaged members with a substantially axial bore having a counterbore, a taper, an eccentric hole, an undercut, an internal thread, a countersink and a spotface.

4. The device claimed in claim 2, in which each member is substantially semi-cylindrical and the outer surface thereof is distorted from cylindrical curvature so as to be configured to provide the device composed of the engaged members with the shapes of a chamfer, an external thread, an undercut, a boss, a knurl, a cam, a journal, a fillet, a flange, a Woodruff keyway and a spline.

5. The device claimed in claim 2, in which each member is substantially semi-cylindrical and the mating surface thereof is configured to provide the device composed of the engaged members with a substantialy axial bore having a counterbore, a taper, an eccentric hole, an undercut, an internal thread, a countersink and a spotface, and the outer surface of each member is distorted from cylindrical curvature so as to be configured to provide the device composed of the engaged members with the shapes of a chamfer, an external thread, an undercut, a boss, a knurl, a cam, a journal, a fillet, a flange, a Woodruff keyway and a spline.

OLLIE W. PHILLIPS.

REFERENCES CITED

The following references are of record in the file of this patent:

UNITED STATES PATENTS

| Number | Name | Date |
| --- | --- | --- |
| 687,570 | Mitchell | Nov. 26, 1901 |
| 727,140 | Hill et al. | May 5, 1903 |
| 799,609 | Ludwig | Sept. 12, 1905 |
| 1,671,938 | Sinclair | May 29, 1928 |
| 1,954,561 | Cygon | Apr. 10, 1934 |
| 2,058,265 | Selley | Oct. 20, 1936 |
| 2,269,035 | Neal | Jan. 6, 1942 |
| 2,338,850 | Heyden | Jan. 11, 1944 |
| 2,346,225 | Marak | Apr. 11, 1944 |
| 2,394,282 | Withers | Feb. 5, 1946 |

OTHER REFERENCES

Working Models, Series No. 3, Model 3, 1922.